United States Patent

[11] 3,595,588

| [72] | Inventor | John E. Rode<br>Ligonier, Pa. |
| [21] | Appl. No. | 841,352 |
| [22] | Filed | July 14, 1969 |
| [45] | Patented | July 27, 1971 |
| [73] | Assignee | Temper Corporation<br>Ligonier, Pa. |

[54] STATIC SEAL WITH FOIL LAMINATE
14 Claims, 12 Drawing Figs.

[52] U.S. Cl. .................................................. 277/206 R,
                                                    277/235 R
[51] Int. Cl. .................................................. F16j 15/08
[50] Field of Search ........................................ 277/205,
                                            235, 236, 206 R, 235 R

[56] References Cited
UNITED STATES PATENTS

| 3,012,802 | 12/1961 | Waite | 277/236 |
| 3,240,501 | 3/1966 | Smith | 277/236 X |
| 3,272,521 | 9/1966 | McNenny | 277/205 |

*Primary Examiner*—Robert I. Smith
*Attorney*—Melvin A. Crosby

ABSTRACT: The invention pertains to a deformable metal seal having a base member imparting the shape and structural strength to the seal with a foil of softer material laminated with the body member to improve the sealing characteristics of the seal.

PATENTED JUL 27 1971 3,595,588
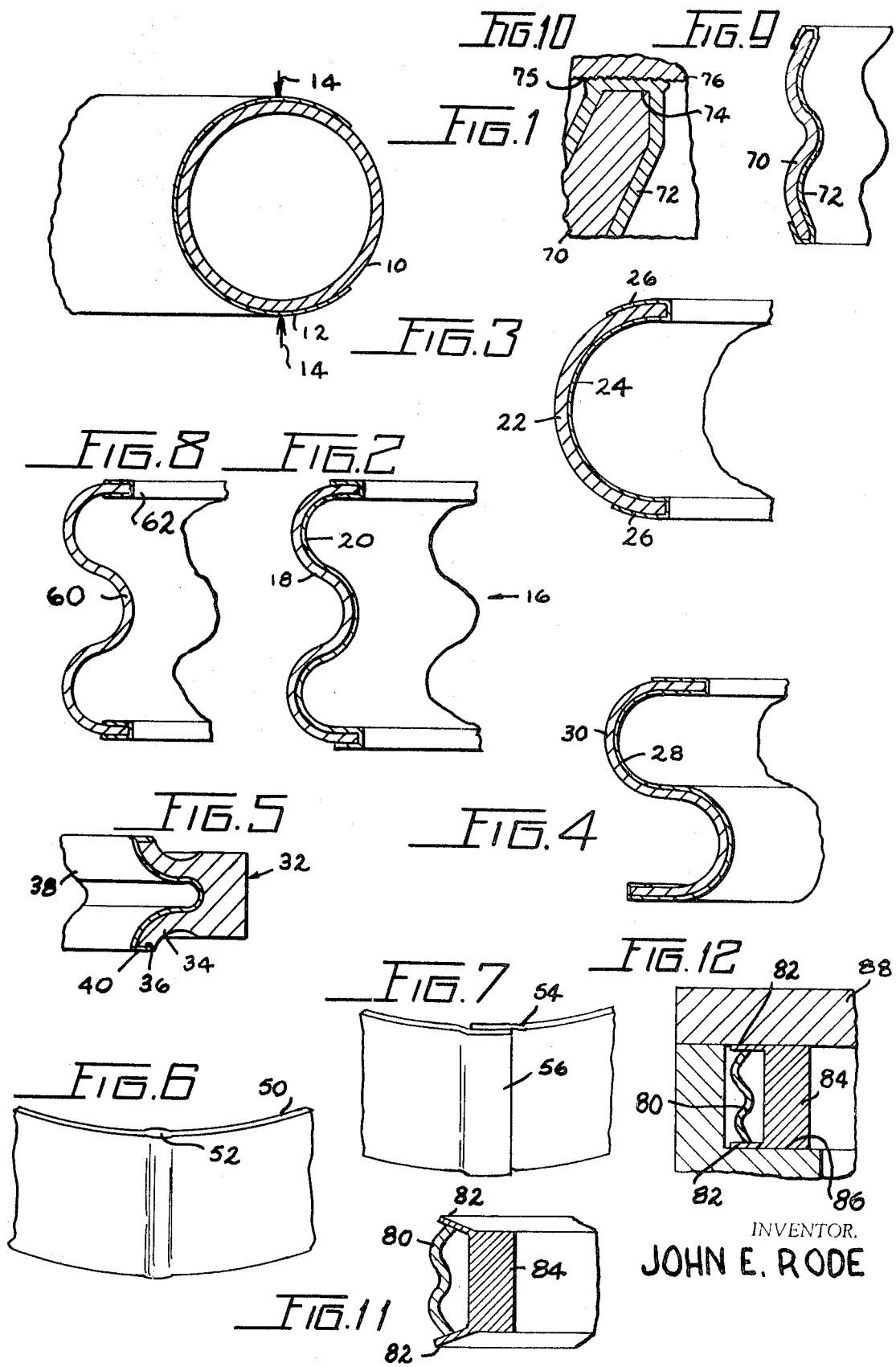
INVENTOR.
JOHN E. RODE

STATIC SEAL WITH FOIL LAMINATE

This invention relates to seal elements and is particularly concerned with static deformable metallic seal elements.

Metallic seal elements are known and are employed where sealing and gasket materials of nonmetallic materials would fail due to conditions of pressure, temperature, corrosion, or a combination thereof. Metallic seal elements customarily seal against metal surfaces and, because of the low degree of flowability of the seal elements and the surfaces engaged thereof, the surfaces and the portions of the seal elements which engage such surfaces must be machined to a high degree of smoothness to establish proper sealing conditions.

Irregularities in the sealing surfaces can permit leakage past the seal elements unless one of the seal elements and the member which it engages deform so as to fill up any such irregularities. Seals are known in which at least the sealing area of the seal element is coated with a relatively soft material, such as silver, or Babbitt metal, or the like, but such seal elements have heretofore met with limitations. Silver, as a coating material for this purpose, is in itself expensive and the application of the silver to the seal element is an expensive process. Furthermore, silver has a definite maximum temperature at which it is effective, which is exceeded in many metal seal applications.

The use of soft metal coating materials, other than silver, as known heretofore, also involves expensive application procedures.

Plastic materials have also been used as a soft coating material for metal seal elements but this imposes severe temperature limitations on the seal element and restricts the use thereof to applications where nonmetallic seals could be used.

The primary objective of the present invention is the provision of a deformable metallic seal element of the nature referred to in which relatively soft sealing regions are obtained on the seal element, but without the drawbacks referred to above that have been encountered in prior art seal elements.

A still further object of the present invention is the provision of a deformable metallic seal element having a strong metallic base portion with softer metallic portions at the sealing areas of the seal elements which are simply and inexpensively provided.

Still another object of the present invention is the provision of a deformable metallic seal element consisting of a strong metal base member and a softer metallic material which completely protects the base member, while simultaneously providing softer sealing areas on the seal element.

A particular object of the present invention is the provision of a seal element of the nature referred to and a method of making the seal element in which a thin mechanically weak and relatively soft metallic foil element is combined with a stronger metallic base portion to provide a seal element having improved characteristics.

Another object of the present invention is the provision of a deformable metal seal in which a relatively hard resilient metallic seal element body is formed to present predetermined areas at the sealing regions thereof with a softer metal foil disposed over the sealing regions and stressed beyond the elastic limit when the seal element is compressed.

A particular object of the present invention is the provision of a metallic seal element which combines hard and soft elements of stainless steel or a like material into a single unit.

The foregoing objects as well as still other objects and advantages of the present invention will become more apparent upon reference to the following detailed description taken in connection with the accompanying drawings in which:

FIG. 1 is a view partly in section of a metallic O-ring having a metallic foil covering member thereon according to the present invention;

FIG. 2 is a sectional view showing an E-type metallic seal having a metallic foil covering thereon;

FIG. 3 is a sectional view of a C-shaped seal constructed according to the present invention;

FIG. 4 is a sectional view, showing an S-shaped metallic seal element with a metallic foil covering thereon;

FIG. 5 is a sectional view showing still another type of metallic seal element adapted for receiving a metallic foil cover member according to the present invention;

FIG. 6 shows how the ends of a metallic foil strip can be welded together, either before or after the strip is joined to the metallic base member of a seal element;

FIG. 7 is a view similar to FIG. 6, but shows the ends of the metallic foil member can merely be lapped over and not welded together;

FIG. 8 is a view similar to FIG. 2 but showing the foil confined to the edges of the seal member;

FIG. 9 is a section through a somewhat different type of seal element;

FIG. 10 is a fragmentary view of one end of the seal element of FIG. 9, drawn at enlarged scale;

FIG. 11 is a sectional view of still another type of seal element prior to compression; and FIG. 12 is a view of the seal element of FIG. 11 in compressed condition.

SUMMARY OF THE INVENTION

In the practice of the present invention, the body part of a deformable metal seal element is made from a relatively hard resilient metal member which imparts the desired shape and dimensions to the seal element and likewise imparts the resistance to deformation which it is desired for the seal element to possess.

Such a base metal member could comprise a hardened precipitation hardenable stainless steel, or a precipitation hardenable nickel alloy, for example, which are suitable materials for withstanding high temperatures and corrosive environments. Such materials, however, are not sufficiently flowable to conform to minor irregularities in a surface against which they are pressed and the present invention proposes to laminate such a hard, resilient base member with a relatively thin soft metallic foil which is also preferably a material such as stainless steel or a stainless nickel alloy.

The soft stainless metal foil preferably extends over the surface of the base member toward the region being confined by the seal and over the sealing regions of the base member. The softer foil, at the extremely high pressures developed in the sealing regions of a deformable metallic seal of the nature referred to will readily flow into the small irregularities of the surface engaged by the sealing element as well as any irregularities in the sealing element itself and will thus greatly improve the effectiveness of the seal.

The foil can be laminated with the base element in any suitable manner, such as by forming the foil over the base element after the base element has been constructed to the desired size and shape and can be free of any attachment to the base element or can be secured thereto by a cement or adhesive which will hold the foil to the base member thereby making it easier to handle the seal element.

The foil can be brought to the base member in the form of an endless ring in which case no joints will be found in the foil, but the foil can also be applied to the base member in the form of a strip with the ends of the strip in overlapping relation. By the application of pressure and rolling such overlapped ends can be pressed together and reduced in thickness to the thickness of the remainder of the foil so that the sealing surfaces of the seal element will be free of any irregularities.

DETAILED DESCRIPTION

Referring to the drawings somewhat more in detail, FIG. 1 shows a section through a more or less conventional metallic O-ring. The O-ring comprises a base member 10 which may be formed of a relatively hard resilient metallic material such as a stainless steel or an alloy known in the trade as Inconel X. The wall thickness of base member 10 might be on the order of from, say, 0.010 to 0.030 inches in thickness depending upon the size and application of the seal element. A length of tubing can be formed to the shape of the seal element and the ends thereof welded together to form base or body member 10.

As will be seen in FIG. 1, there is laminated with the base member 10 a strip of thin foil 12 which is a soft material, preferably stainless steel or a nickel alloy, on the order of from 0.002 to 0.015 inches in thickness. The foil 12 can be applied to base member 10 by pressing or rolling and will be free of wrinkles at least on the side of base member 10 toward the center thereof, which is to the left in FIG. 1.

The end parts of foil 12, when folded back on base member 10 to the position indicated, if not entirely wrinkle free, can be rolled to remove any wrinkles therefrom. The foil 12, as illustrated, will remain in assembled relation with base member 10 without any further treatment but, if desired, a thin layer of cement or adhesive can be interposed between foil 12 and base member 10 to provide for adherence of the foil to the base member for ease in handling the seal element before the assembly thereof between the members which it is to seal.

When the seal element is compressed between the elements which it is to seal, forces will be exerted on the seal element in the directions of the arrows 14 and any irregularities in the surfaces engaging the seal element will be filled in by the flowability of foil coating 12. The foil coating, inasmuch as it is a stainless metallic material of the nature referred to, is resistant to corrosive influences and can withstand temperatures as high as any to which stainless steel or nickel alloy closures are exposed.

The seal element as illustrated in FIG. 1 is substantially more inexpensive to arrive at than seal elements which have plated or sprayed on softer metal coatings and is, furthermore, capable of operation at higher temperatures and in more corrosive environments than coating materials such as silver or copper or the like. Still further, a substantially conventional metallic seal element can be provided with foil coating as shown and the characteristics of the seal element thereby improved.

In FIG. 2 there is illustrated an E-type seal element 16 wherein the base portion 18 is, as in the case of the seal element of FIG. 1, made of a relatively hard resilient metal. Mounted on and conforming to the configuration of base member 18 is a thin layer of soft stainless metal foil 20 which extends over the face of the seal element exposed to the region being sealed and backwardly over the ends of the seal element where the actual sealing of the element to the members which it seals is established.

As in the case of the seal element of FIG. 1, foil 12 could be cemented to the base member or it could be merely laminated therewith with no connection of the foil to the base member other than the interlocking of the shapes thereof.

FIG. 3 shows a C-shaped seal element having a body member 22 and a layer 24 of relatively thin soft stainless metal foil applied thereto. The foil is applied to the C-shaped element of FIG. 3 in the same manner as in connection with the O-ring of FIG. 1 except that in the FIG. 3 modification the edges of the foil strip at 26 are turned backwardly at the top and bottom of the C-shaped element.

FIG. 4 shows how a foil layer 28 could be applied to an S-shaped metallic seal having a base member 30 of relatively hard resilient metal.

FIG. 5 shows a seal member having a body 32 that has leg portions 34 extending therefrom and the leg portions have end parts 36 for sealing engagement with the members to be sealed. With the arrangement of FIG. 5, the blocklike part of the seal element remote from the ends 36 of legs 34 limits the compressibility of the seal element and the resilience of legs 34 establishes the sealing contact pressure on the ends 36 of the legs. In accordance with the present invention, a foil layer 38 is applied to the seal and has the ends thereof formed backwardly at 40 so as to lay over the end parts 36 of legs 34. The foil can be trimmed off at the back edges of end parts 36 and may be bonded to the body of the seal element by a thin layer of adhesive if so desired.

FIG. 6 shows a ring 50 made of stainless metal foil and welded together at 52. The welding together of the ends of the foil may form a slight bump or region of increased thickness along the length of the foil but this can easily be rolled or pressed out, taking care not to work harden the foil material excessively.

FIG. 7 shows how the ends of a strip of foil 54 can merely be overlapped as at 56. This overlapping occurs when the stainless metal foil is applied to the base member of the seal element and the resulting increased thickness in the foil layer can be pressed or rolled out after the foil has been laminated with the body member of the seal element.

The foil, since it is relatively soft and ductile, can be laminated with the base member by rolling but the foil can also be applied to the base by radially deforming the foil into contact with the base member, as by the expansion of a rubber die member or the like into engagement with the base member while the foil is interposed therebetween. In either case, an adhesive, in the form of a contact cement, for example, could be employed for securing the foil to the base member if so desired. Further, in either case, any wrinkles that might develop in the foil material during its application to the base member can be removed therefrom by pressing or rolling.

The laminated composite seal element of the present invention is relatively simple to manufacture and is thus relatively inexpensive and is adapted for use in any environment that will receive a metal seal and including environments characterized in high or cryogenic temperature and corrosive influences.

In the foregoing modifications, the foil member has been arranged to extend completely across the side of the seal element which faces the confined region. However, as shown in FIG. 8, a body member 60 could be provided with strips of foil 62 extending over the sealing areas and advantageously clamped backwardly inside the ends of the body member to form a mechanical connection of the foil with the body member.

FIG. 9 illustrates a metallic seal element of convoluted form having a body member 70 of hard resilient metal and a soft foil coating 72 thereon. FIG. 10 shows an enlargement of one end of the seal element and in FIG. 10 it will be seen that the end of the body member at 74 is so formed as to present a predetermined area which, when pressed against the flange 76, will stress foil 72 beyond the elastic limit thereof thereby causing it to flow into any irregularities in the surfaces of the flange and the end of body member 70 thereby producing a highly effective seal. Such irregularities, which might be machining marks, are illustrated in somewhat enlarged form at 75. It will be noted that, even though the foil is stressed beyond the elastic limit, there is no possibility of complete extrusion thereof from the sealing region nor is there any possibility for the foil to be extruded laterally due to confined pressures.

FIG. 11 shows a modification wherein the convoluted body member of the seal is indicated at 80 and the sealing ends thereof engage between the thin flanges 82 which are attached to or integral with a ring member 84 of substantial cross section. FIG. 12 shows the seal element of FIG. 11 confined in a cavity 86 by a flange 88. The flanges 82 are of soft metal and are of about the thickness of the foil materials referred to above so that the same sealing conditions are established as has been explained with the previous modifications. The arrangement of FIGS. 11 and 12 provides for a strong easily handled seal arrangement and the ring member 84 can serve to assume a portion of the force acting on flange 88 thereby to limit the amount which the body member 80 is deformed.

In all of the modifications referred to there has been shown a convoluted element of constant wall thickness, or a metal body member so configured as to be compressible thereby to build up high pressures in the sealing regions.

In every case, a soft alloy of stainless material is employed in combination with a relatively hard material, preferably of similar characteristics with regard to thermal expansion and contraction.

As has been mentioned, a preferable material is a stainless steel or a nickel alloy for both the body member and the foil. Heretofore, these materials have been regarded as structural materials and where soft material overlays were desired, a metal such as silver or copper or Babbitt metal were employed. The present invention, by presenting a controlled area to the sealing region and then employing the controlled area to subject the softer metal to compression of such a degree as to cause plastic deformation, or coining, of the soft metal in the sealing region, permits the stainless materials referred to to be employed for the foil. The foils referred to have a yield stress on the order of from about 15,000 to 25,000 pounds per square inch whereas the body members will exhibit yield strengths of from about 100,000 to 200,000 pounds per square inch.

By controlling the area of the body member presented to the sealing region, the seal element, even with a relatively low total compressive force, can build up the necessary pressure on the foil to cause plastic deformation thereof. The seal elements according to the present invention have inside utility in high-temperature applications and applications where corrosive influences are present and in applications where extremely lightweight but highly effective seal elements are required, such as in connection with aircraft and space components and the like.

The body member of the seal element can advantageously be formed of a hardened precipitation hardenable stainless steel such as AMS5525. The base member is formed to the desired shape before a hardening heat treatment which consists, in the case of the AMS5525 stainless steel, of holding the body member at about 1300° F. for about 16 hours followed by a slow cooling.

Either before or after the heat treatment, the foil is applied to the body member. The foil does not harden appreciably during heat treatment and can, therefore, be considered to be substantially unaffected by the heat treatment.

The body member can also be made of hardened Inconel X material which is a nickel alloy.

For use with the stainless steel body member, a foil in the form of a soft-type 304 stainless steel can be used and with the Inconel X body member a soft Inconel foil or Monel metal foil can be employed.

The foil is preferably matched with the base member so that they are compatible with respect to thermal expansion. Furthermore, in use, the seal elements are preferably matched with the flanges or the like which they engage. For example, the seals made of Inconel will operate quite well with series 400 stainless steel and the stainless steel seal elements as referred to above will operate quite well with 300-series stainless steel flanges.

Modifications can be made in the invention within the purview of the appended claims.

I claim:

1. A metallic static seal element adapted for being axially compressed between opposed annular surfaces of a pair of work members to form a seal therebetween, said seal element comprising: a circumferentially continuous tubular body member of a relatively hard resilient metal having axially spaced radially directed end portions, each end portion having an endless annular sealing region thereon which includes at least that part of the respective end portion most remote from said body member, each said sealing region facing away from the other said end portion of said body member, said body member comprising at least one annular region disposed axially between said sealing regions which is curved in the axial direction to impart axial resilience to said body member, and metal foil means softer than the metal of said body member carried by said body member and extending over each said sealing region so as to be interposed between said sealing regions and the said annular surfaces of said work members engaged by said sealing regions when the seal element is in operative axially compressed position between said work members, and a tubular member on at least one of the inside and outside of said body member connected to the foil means at opposite ends of said body member and together with said foil means presenting an uninterrupted surface between said sealing regions.

2. A metallic seal element according to claim 1 in which said tubular member is formed of foil and closely follows the contour of said body member.

3. A metallic seal element according to claim 2 in which a layer of cement is interposed between said tubular member and said body member and bonds said tubular member to said body member.

4. A metallic seal element according to claim 2 in which said tubular member is in the form of a strip of foil having its ends welded together to form a joint free ring.

5. A metallic seal element according to claim 2 in which said tubular member is in the form of a strip of foil having its ends in overlapping relation.

6. A metallic seal element according to claim 1 in which said tubular member is in the form of a cylinder having a wall thickness greater than the thickness of said foil means, said cylinder having an axial length shorter than the free length of said body member and being adapted to limit the movement of said pair of members to be sealed in the seal element compressing direction.

7. A metallic seal element according to claim 1 in which said foil means is selected from the class comprising soft stainless steel and soft stainless nickel alloy.

8. A metallic seal element according to claim 1 in which said body member is selected from the class comprising hardened stainless steel and hardened nickel alloy.

9. A metallic seal element according to claim 1 in which said body member is ringlike in cross-sectional shape.

10. A metallic seal element according to claim 1 in which said body member is C-shaped in cross section.

11. A metallic seal element according to claim 1 in which said body member is E-shaped in cross section.

12. A metallic seal element according to claim 1 in which said body member is generally S-shaped in cross section.

13. A metallic seal element according to claim 2 in which each said sealing region is formed to a radial dimension to present an area to the member which it sealingly engages such that the compressing of the seal into operative condition will stress said foil means beyond the elastic limit thereof throughout the thickness thereof in each said sealing region.

14. A metallic seal element according to claim 13 in which the materials of said body member and tubular member are selected to be compatible with respect to thermal expansion.